United States Patent [19]
Fujimura

[11] Patent Number: 5,635,803
[45] Date of Patent: Jun. 3, 1997

[54] DISPLAY DEVICE WITH SHADOWMASK CRT

[75] Inventor: Takeo Fujimura, Nagaokakyo, Japan

[73] Assignee: Mitsubishi Denki Kabushiki Kaisha, Tokyo, Japan

[21] Appl. No.: 423,750

[22] Filed: Apr. 18, 1995

[30] Foreign Application Priority Data

Apr. 20, 1994 [JP] Japan .................................. 6-081597

[51] Int. Cl.⁶ .......................................... H01J 29/56
[52] U.S. Cl. .......................................... 315/371
[58] Field of Search .................................. 315/370, 371

[56] References Cited

U.S. PATENT DOCUMENTS

| | | |
|---|---|---|
| 4,887,010 | 12/1989 | Fujimura . |
| 4,973,879 | 11/1990 | Fujimura . |
| 5,430,502 | 7/1995 | Yamazaki et al. ............ 348/806 |
| 5,442,262 | 8/1995 | Van Tiel ...................... 315/371 |
| 5,473,223 | 12/1995 | Murakami ................... 315/367 |

FOREIGN PATENT DOCUMENTS

| | | |
|---|---|---|
| 63-26592 | 5/1988 | Japan . |
| 5-236290 | 9/1993 | Japan . |

OTHER PUBLICATIONS

Wireless World, Mar. 1950, pp. 84–86, "Television Spot–Wobble," by R.W. Hallows.

Primary Examiner—Theodore M. Blum

[57] ABSTRACT

A display device with shadowmask CRT comprises an offset scanning means for imparting an offset to the scanning lines. The offset is a shift that gently changes the position of the scanning lines in the Y-axis direction. The offset scanning means imparts the offset in such a way that an interval between neighboring scanning lines is gently changed in accordance with a position in the X-axis direction. The scanning line offset produces some loss in resolution in the Y-axis direction, but since the area which Moire pattern is strongly present coincides with the area of good resolution, even if the offset is imparted in this area, sufficiently high resolution can be obtained.

23 Claims, 9 Drawing Sheets

DISPLAY DEVICE WITH SHADOWMASK CRT

BACKGROUND OF THE INVENTION

This invention relates to a display device with a shadowmask CRT (cathode ray tube), and more particularly, to a method of electron-beam scanning.

A plurality of perforations are formed in the shadowmask in a regular arrangement in the X-axis direction (i.e., horizontal direction) and in the Y-axis direction (i.e., vertical direction). Scanning lines produced when the electron beam impinges through the perforations of the shadowmask onto a light-emitting section are arranged at a substantially equal pitch in the Y-axis direction. Thus, Moire pattern, which is an interference pattern produced by superimposing two types of regular pattern, appears on the phosphor screen.

The principle by which Moire pattern is produced may be explained as follows. When light-emitting sections 20 are disposed as shown in FIG. 1A (in this case the perforations of the shadowmask are disposed in the same manner), the average luminous efficiency $T_A(Y)$ of two neighboring columns of the light-emitting sections 20 that extend in the Y-axis direction (the two neighboring columns of the light-emitting sections are designated by 20a in FIG. 1A) will be as shown in FIG. 1B. Here, $P_A$ designates the pitch in the Y-axis direction of non-light-emitting sections 21 on the phosphor screen (which is substantially equal to half the pitch at which bridges 11 are disposed, as shown in FIG. 3B), and is known as "effective pitch." The average luminous efficiency $T_A(Y)$ is expressed by the following equation using a Fourier series, $$T_A(Y) = A_O + \sum_{m=1}^{\infty} A_m \cdot \cos(2\pi m Y/P_A) \quad (1)$$

On the other hand, the density of the electron beam that excites the phosphor screen, that is to say, the excitation density $T_B(Y)$ exhibits periodicity in the Y-axis direction, as shown in FIG. 2. Here, $P_B$ is an interval in the Y-axis direction between neighboring horizontal scanning lines extending in the X-axis direction. The excitation density $T_B(Y)$ is expressed by the following equation (2) using a Fourier series $$T_B(Y) = B_O + \sum_{n=1}^{\infty} B_n \cdot \cos(2\pi n Y/P_B) \quad (2)$$

Thus, luminance distribution $L(Y)$, which changes according to the position in the Y-axis direction, may be expressed as the product of $T_A(Y)$ and $T_B(Y)$ as follows:

$$\begin{aligned}
L(Y) &= T_A(Y) \times T_B(Y) \quad (3)\\
&= \left\{ A_O + \sum_{m=1}^{\infty} A_m \cdot \cos(2\pi m Y/P_A) \right\} \times \\
&\quad \left\{ B_O + \sum_{n=1}^{\infty} B_n \cdot \cos(2\pi n Y/P_B) \right\} \\
&= A_O B_O + \sum_{m=1}^{\infty} \{B_O A_m \cdot \cos(2\pi m Y/P_A) + \\
&\quad \sum_{n=1}^{\infty} \{A_O B_n \cdot \cos(2\pi W n Y/P_B) + \\
&\quad \sum_{m=1}^{\infty} \sum_{n=1}^{\infty} \{A_m B_n \cdot \cos(2\pi m Y/P_A) \cdot \cos(2\pi n Y/P_B)\}
\end{aligned}$$

In Equation (3), the second term represents the mosaic pattern of the light-emitting sections 20, the third term represents the scanning line pattern, and the fourth term may be rewritten as follows:

$$\begin{aligned}
&\sum_{m=1}^{\infty} \sum_{n=1}^{\infty} \{A_m B_n \cdot \cos(2\pi m Y/P_A) \cdot \cos(2\pi n Y/P_B)\} \quad (4)\\
&= \sum_{m=1}^{\infty} \sum_{n=1}^{\infty} \{(A_m B_n/2) \cdot \cos 2\pi Y(m/P_A + n/P_B) + \\
&\quad (A_m B_n/2) \cdot \cos 2\pi Y(m/P_A - n/P_B)\} \\
&= \sum_{m=1}^{\infty} \sum_{n=1}^{\infty} \{(A_m B_n/2) \cdot \cos(2\pi Y(m/P_A + n/P_B)) + \\
&\quad (A_m B_n/2) \cdot \cos 2\pi Y \frac{1}{P_A P_B/(mP_B - nP_A)} \}
\end{aligned}$$

Since the first term of Equation (4) is a periodic function of pitch, which is smaller than pitch of either the mosaic pattern of the light-emitting sections 20 or the scanning line pattern, it has no effect on picture quality. But the second term of Equation (4), known as Moire term, is a periodic function that may have an extremely large spatial function (pitch), where the pitch is $\{P_A P_B/(mP_B - nP_A)\}$, and the amplitude is $(A_m B_n/2)$, so there is the possibility that large Moire pattern is clearly visible to the naked eye.

One of the conditions in which Moire pattern is conspicuous occurs when the pitch $\{P_A P_B/(mP_B - nP_A)\}$ becomes large, that is to say, when $mP_A$ and $nP_B$ are substantially equal. Thus, the scanning line pitch $P_B$ and effective pitch $P_A$ are normally selected in such a way that $mP_A$ does not approach $nP_B$. Again, generally speaking, the value of $A_m B_n$ is particularly large when $m+n \leq 5$. In the case of display devices for computers, however, scanning line pitch $P_B$ is not necessarily constant, so that it is difficult to assure that $mP_B$ and $nP_A$ do not approach.

U.S. Pat. No. 4,887,010 discloses a proposal by the present applicant to overcome these problems by displacing the position of the scanning lines slightly in the Y-axis direction. This method, however, gives rise to separate problems in that scanning line pitch is made uneven, resulting in degradation in picture quality when evaluated on criteria other than Moire pattern, and in requiring a current source having an extremely wide frequency range.

SUMMARY OF THE INVENTION

The object of this invention is to provide a display device with a shadowmask CRT that can reduce Moire pattern, while minimizing degradation in picture quality.

According to the present invention, a display device comprises: a substantially rectangular phosphor screen having first sides extending in an X-axis direction and second sides extending in a Y-axis direction which is at right angles to the X-axis direction; a shadowmask disposed oppositely to the phosphor screen and provided with a plurality of perforations arranged regularly in the X-axis and Y-axis directions; an electron gun assembly for emitting electron beams that pass through the perforations of the shadowmask and impinge on the phosphor screen; an X-deflection device for causing the electron beams from the electron gun assembly to scan in the X-axis direction and describe scanning lines on the phosphor screen; a Y-deflection device for changing a position of the scanning lines in the Y-axis direction; an X-deflection power supply for supplying an X-deflection current to the X-deflection device; a Y-deflection power supply for supplying a Y-deflection current to the Y-deflection device; and an offset scanning device for imparting an offset, which is a shift that gently changes the position of the scanning lines in the Y-axis direction in such a way that an interval between neighboring scanning lines is gently changed in accordance with a position in the X-axis direction.

DETAILED DESCRIPTION OF THE INVENTION

Preferred embodiments of this invention will be described below.

First Embodiment

Figure 3A:
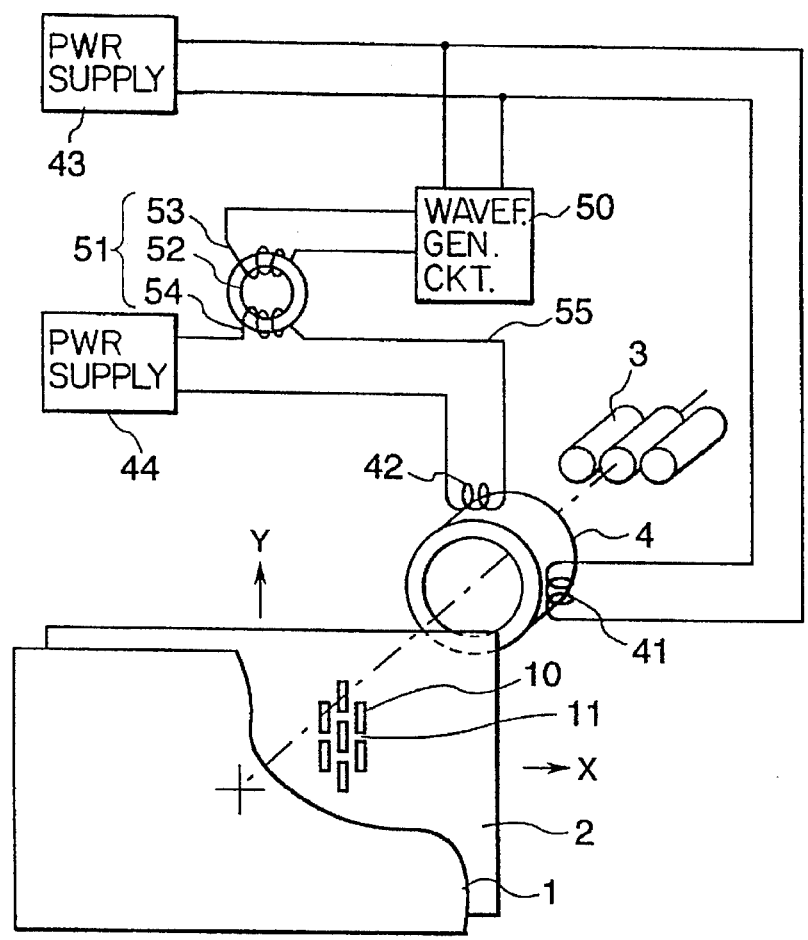
FIG. 3A and FIG. 3B are diagrams showing, respectively, the structure of the main portion of a display device according to a first embodiment of this invention, and a magnified view of the shadowmask and the phosphor screen.
Figure 3B:
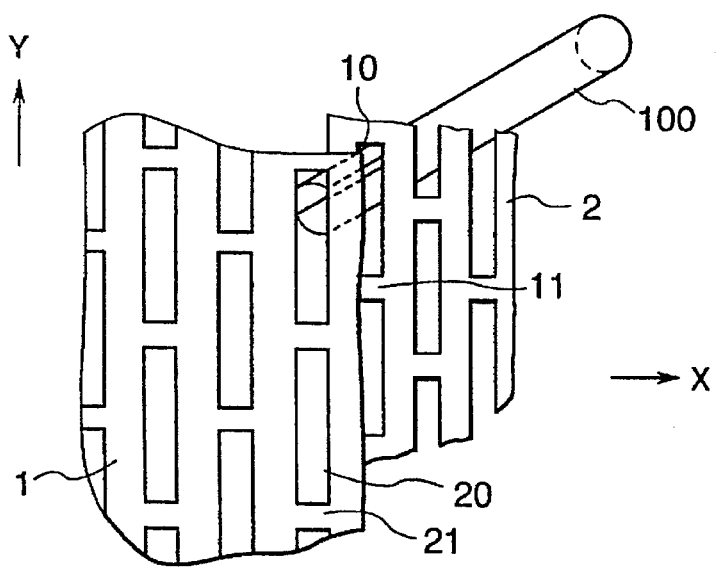

FIG. 3A shows the structure of the main portion of a display device with a shadowmask CRT according to a first embodiment of this invention, and FIG. 8B shows a magnified view of a shadowmask and a phosphor screen.

The display device of the first embodiment comprises a phosphor screen 1 that is provided with phosphors, a shadowmask 2 that is disposed opposite to the phosphor screen 1, and an electron gun assembly 8 that emits an electron beam 100 toward the phosphor screen 1, a deflection yoke 4 that deflects the electron beam 100 emitted from the electron gun assembly 13, a power supply 43 for X-deflection, and a power supply 44 for Y-deflection.

Figure 1A:
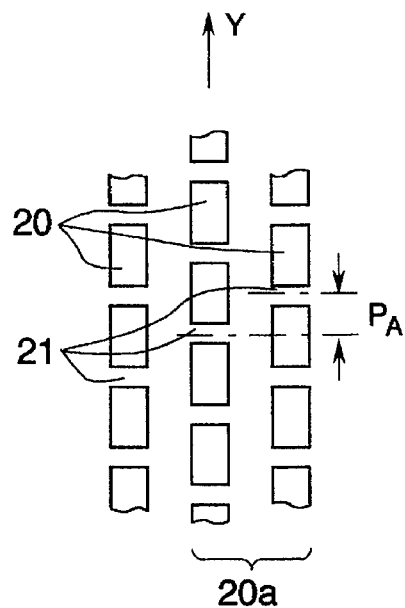
FIG. 1A and FIG. 1B are diagrams showing, respectively prior art light-emitting sections on a phosphor screen, and average luminous efficiency $T_A(Y)$.
Figure 1B:
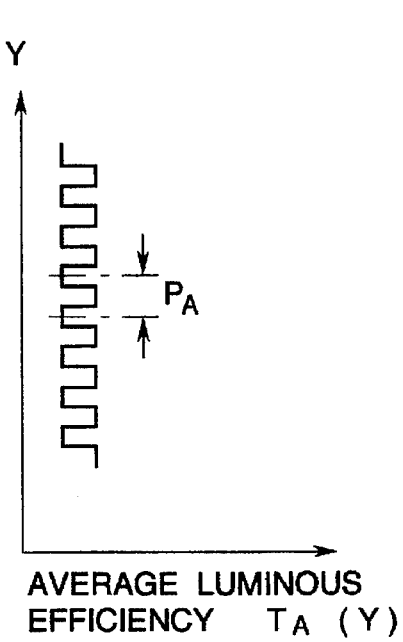

The shadowmask 2 is provided with a plurality of perforations 10 that are disposed regularly in the horizontal X-axis direction and in the vertical Y-axis direction and allow the electron beam 100 to pass through. The perforations 10 form rectangles that are elongated in the Y-axis direction, and between perforations neighboring in the Y-axis direction there are formed bridges 11 that do not allow the electron beam 100 to pass through. Further, a plurality of columns of perforations aligned in the Y-axis direction are disposed in the X-axis direction so that the perforations 10 and bridges 11 of the each columns which are neighboring in the X-axis direction are at an offset of one half of the pitch of perforations 10 in the Y-axis direction (the magnitude of this offset is equivalent to $P_A$ in FIG. 1A).

The electron gun assembly 3 is of an in-line type, comprising three electron guns for the colors red, green and blue, aligned in the X-axis direction. When the electron beam 100 emitted from the electron gun assembly 3 passes through the perforations 10 of the shadowmask 2 and impinges on the phosphor screen 1, it causes the phosphors to emit light. The area on the phosphor screen 1 that is in the shadow of the bridges 11 of the shadowmask 2 and is not hit by the electron beam 100 forms non-light-emitting section 21.

The deflection yoke 4 comprises an X-deflection coil 41 that deflects the electron beam 100 in the X-axis direction and causes it to scan horizontally, and a Y-deflection coil 42 the deflects it in the Y-axis direction. The X-deflection coil 41 is supplied by the X-deflection power supply 43 with a saw tooth-shaped high-speed repeating current (X-deflection current) of frequency $f_x$, for deflecting the electron beam from the electron gun assembly 3 in the X-axis direction so as to trace out a horizontal scanning line. On the other hand, the Y-deflection coil 42 is supplied by the Y-deflection power supply 44 with a saw tooth-shaped repeating current (Y-deflection current) of comparatively low frequency $f_y$, for deflecting the electron beam in the Y-axis direction so as to trace out a frame.

In addition to the structure described above, the display device of the first embodiment further comprises a waveform generating circuit 50 that receives a signal from the X-deflection power supply 43 for detecting the phase of the X-deflection current and generates at least a current having a frequency of $0.5f_x$ and a current having a frequency of $1.5f_x$ that are in synchronism with the signal from the X-deflection power supply 43. The display device further comprises a coupling circuit 51 that mixes the current generated by the waveform generator circuit 50 into the Y-deflection current in the form of a ripple, and imparts a slight offset to the deflection magnitude of the electron beam 100 in the Y-axis direction.

As shown in FIG. 8A, the coupling circuit 51 is a transformer mechanism comprising a core 52, a primary coil 53, and a secondary coil 54, in which the primary coil 52 is connected to the output of the waveform generating circuit 50, and the secondary coil 54 is connected to an output line 55 that joins the Y-deflection power supply 44 and the Y-deflection coil 42.

Figure 4:
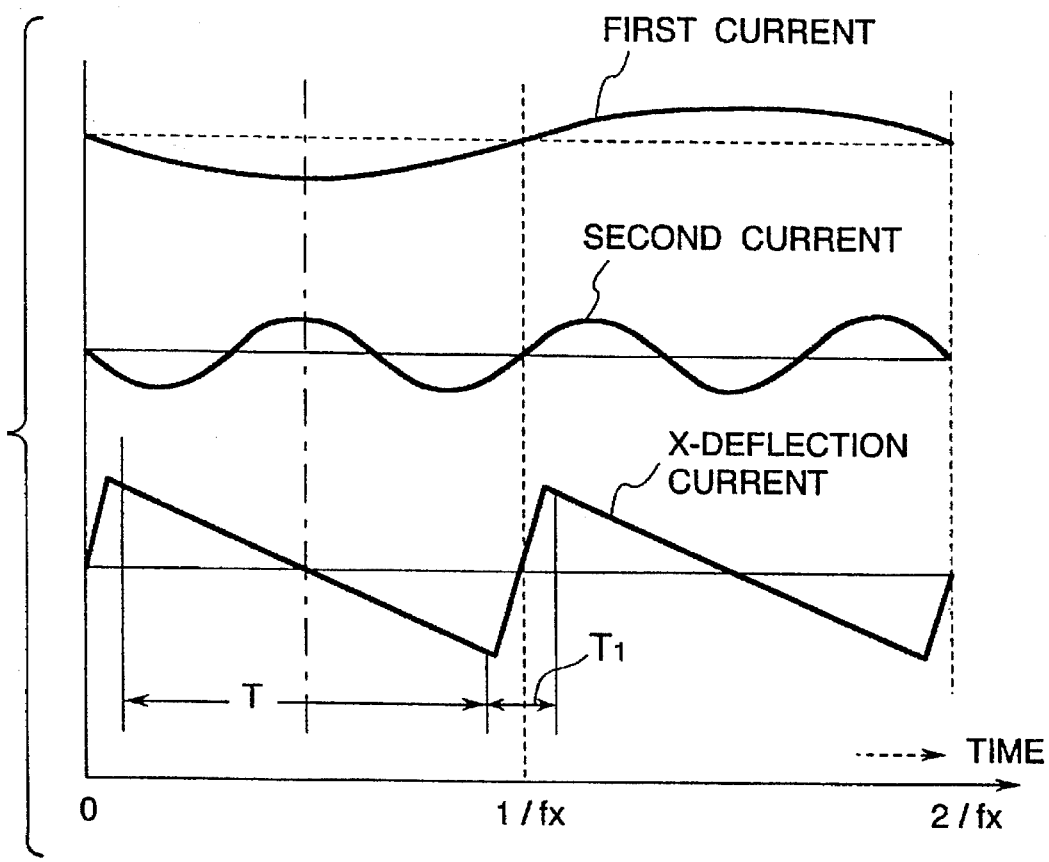
FIG. 4 is a diagram showing the waveform of a first current having a frequency of $0.5f_x$, the waveform of a second current having a frequency of $1.5f_x$, and the saw tooth-shaped waveform of an X-deflection current having a frequency of $f_x$.

FIG. 4 shows the waveform of a first current generated by the waveform generating circuit 50 and having a frequency of $0.5f_x$, the waveform of a second current generating the waveform generating circuit 50 and having a frequency of $1.5f_x$, and the saw tooth-shaped waveform of an X-deflection current having a frequency of $f_x$. The phase relationship between the first and second currents is shown across two cycles of the X-deflection current.

Figure 5:
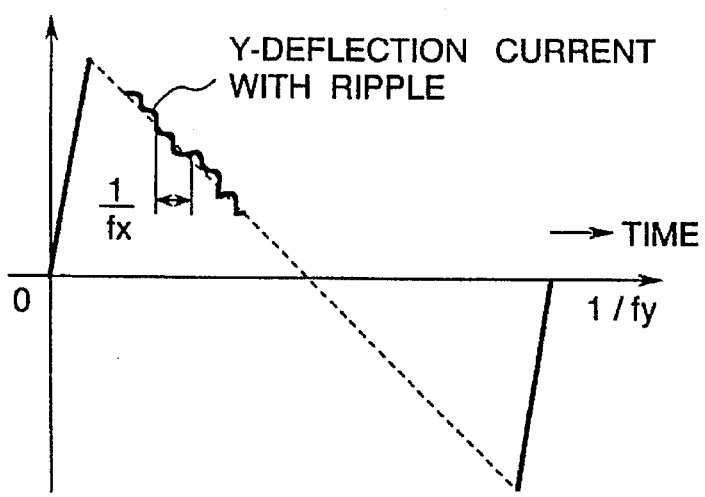
FIG. 5 is a diagram showing the waveform of a Y-deflection current containing a ripple component.

In the first embodiment, the first and second currents, as shown in FIG. 4, have identical peak values, but a phase relationship such that when the first current reaches a peak, the second current reaches a peak of opposite sign to that of the first current is maintained. Again, as shown in FIG. 4, in the course of two periods of the X-deflection current (time $2/f_x$), the first current fluctuates in the form of a sine wave one cycle and the second current repeats three cycles of fluctuations in the form of a sine wave. The first and second currents are mixed into the Y-deflection current by the coupling circuit 51, so that the Y-deflection current has, as shown in FIG. 5, a saw tooth-shaped waveform of long period, in which is included a minute ripple component. Note that FIG. 5 depicts only a portion of the ripple formed from the first and second currents, and that the waveform of the ripple has been simplified.

Figure 6:
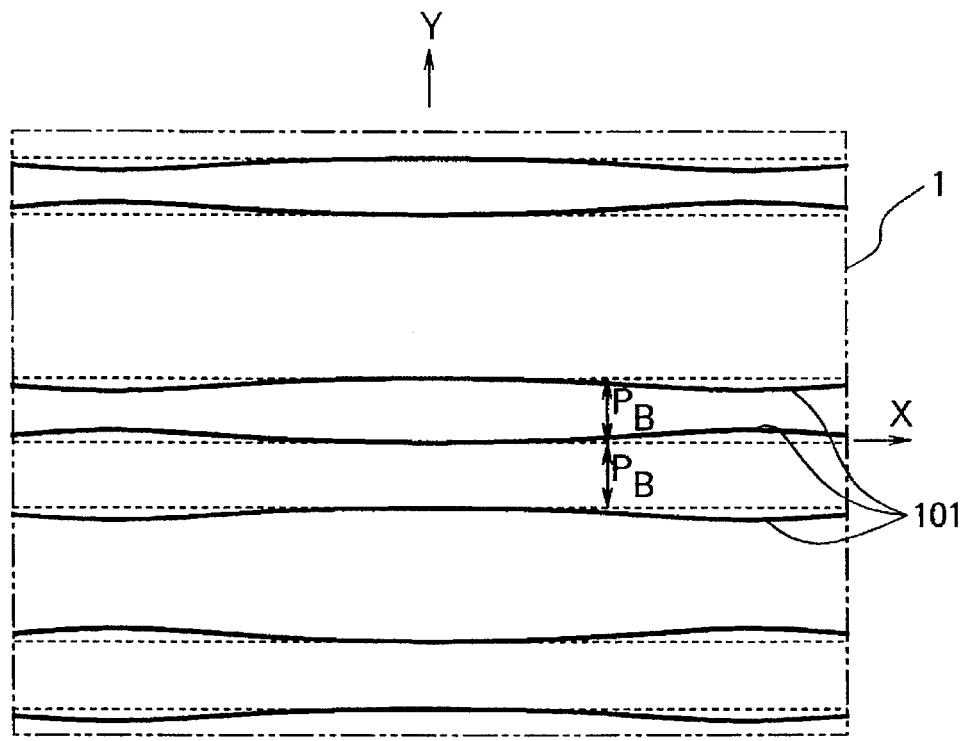
FIG. 6 is a diagram showing a plurality of scanning lines scanned by a Y-deflection current to which have been added the first current and the second current.

FIG. 6 shows a plurality of scanning lines 101 scanned by a Y-deflection current to which has been added the first and second currents. The scanning lines of prior art, shown by broken lines, were described on the phosphor screen 1 at equal intervals $P_B$. But in a case, such as in the first embodiment, when the Y-deflection current includes a ripple component comprising the first and second currents, each of scanning lines 101 is displaced (that is to say, offset) from the positions shown by the broken lines to those of the solid lines. When the frequency of the first current $0.5f_x$, and that off the second current is $1.5f_x$, the offset, as shown in FIG. 6, is opposite in direction for any two neighboring scanning lines 101.

Figure 7:
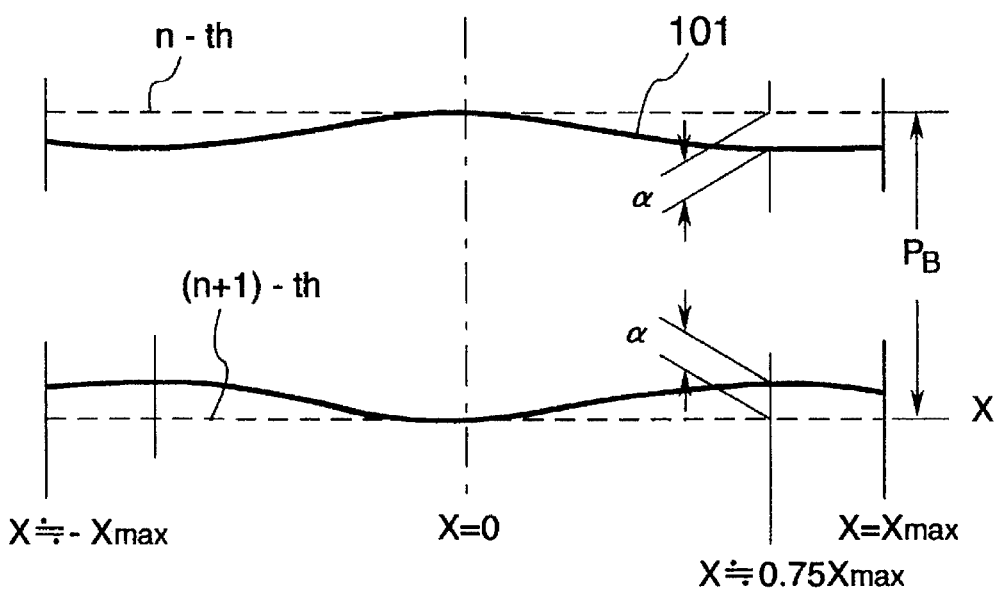
FIG. 7 is a view of two neighboring scanning lines from FIG. 6, magnified in the Y-axis direction.

FIG. 7 shows two neighboring scanning lines 101 from FIG. 6, magnified in the Y-axis direction. In FIG. 7, the position at the center of the phosphor screen 1 in the X-axis direction is denoted by X=0, the left edge by $X=-X_{max}$, and the right edge by $X=X_{max}$. At the center of phosphor screen 1 in the X-axis direction (X=0), the first and second currents cancel out each other so that there is no offset. As |X| increases, the offset then increases, reaching its maximum value α in the vicinity of $|X|=0.75X_{max}$, and a value of approximately 0.7 α when $|X|=X_{max}$. The reason why the offset is maximized when $|X|=0.75X_{max}$ is as shown in FIG. 4, that although one period of the X-deflection current is $(T+T_1)$, the expression time for exciting the phosphor screen 1 is only the time period T, and the time period T normally has a value of about $0.8(T+T_1)$.

Figure 8:
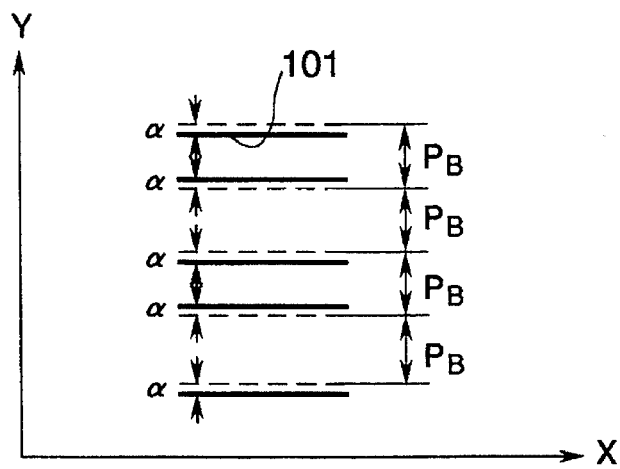
FIG. 8 to FIG. 10 are diagrams for the purpose of explaining the principle by which Moire pattern is reduced.

It may be assumed that in the first embodiment, the disposition of the scanning lines in the vicinity of the value at which the offset reaches its maximum value α, is as shown by the solid lines in FIG. 8, and in that portion in which the scanning lines are offset, Moire pattern can be reduced. Again, in the first embodiment, the offset a is maximized in the vicinity of the point at which $|X|=0.75X_{max}$ and the offset α is equal to 0 at the point where X=0. Thus, Moire pattern is reduced at both edges of the phosphor screen 1 in the X-axis direction, where Moire pattern is most likely to be conspicuous in in-line CRTs. On the other hand, since in-line CRTs, Moire pattern is less conspicuous at the center of the phosphor screen, the offset is reduced at the center of the phosphor screen, thereby improving the quality of the picture at the center of the phosphor screen as evaluated by criteria other than Moire pattern.

The reason wily Moire pattern generated at mode (m, n) is reduced or eliminated by selecting a suitable value of a is explained below.

The problem that Moire pattern at mode (m, n) is generated when the scanning lines are disposed at equal intervals, is as was noted in the explanation of Equations (1) to (4). That is to say, there is mutual interference between the m-th higher harmonic component of the average luminous efficiency $T_A(Y)$ (fundamental period $P_A$) which is a periodic function of Y and the n-th higher harmonic component of the excitation density (electron beam density) $T_B(Y)$ applied to the phosphor screen by the electron beam (fundamental period $P_B$), which is also a period function of Y, which generates the light intensity pattern that is described by the second term of Equation (4). Thus, if each scanning line 101 can be shifted or offset in the opposite direction to its neighboring scanning line by α, the magnitude of the n-th harmonic of the excitation density $T_B(Y)$, that is to say, $B_n$ can be reduced or extinguished and then Moire pattern is reduced or extinguished.

Figure 2:
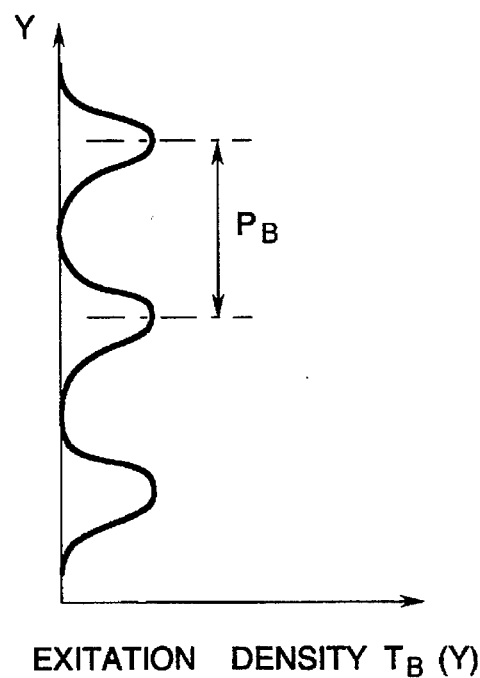
FIG. 2 is a diagram showing the prior art excitation density $T_B(Y)$ of the electron beam that excites the phosphor screen.
Figure 9:
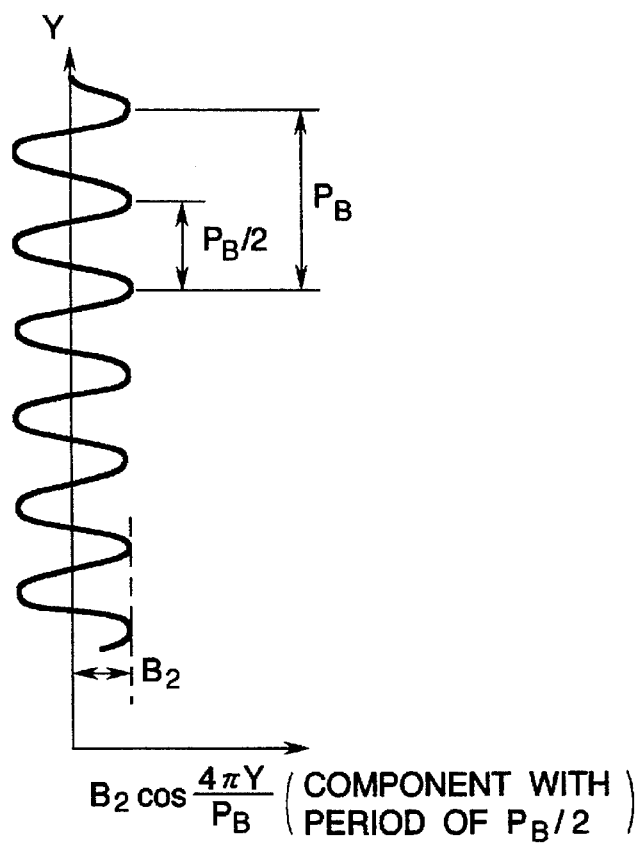

As a specific example, when n=2, the fact that the magnitude $B_2$ of the second higher harmonic is not 0 means that sine wave component as a higher harmonic is included in the excitation density $T_B(Y)$ shown in FIG. 2 and Equation (2), the higher harmonic of which the period is $P_B/2$ and the amplitude is $\pm B_2$ as shown in FIG. 9.

Figure 10:
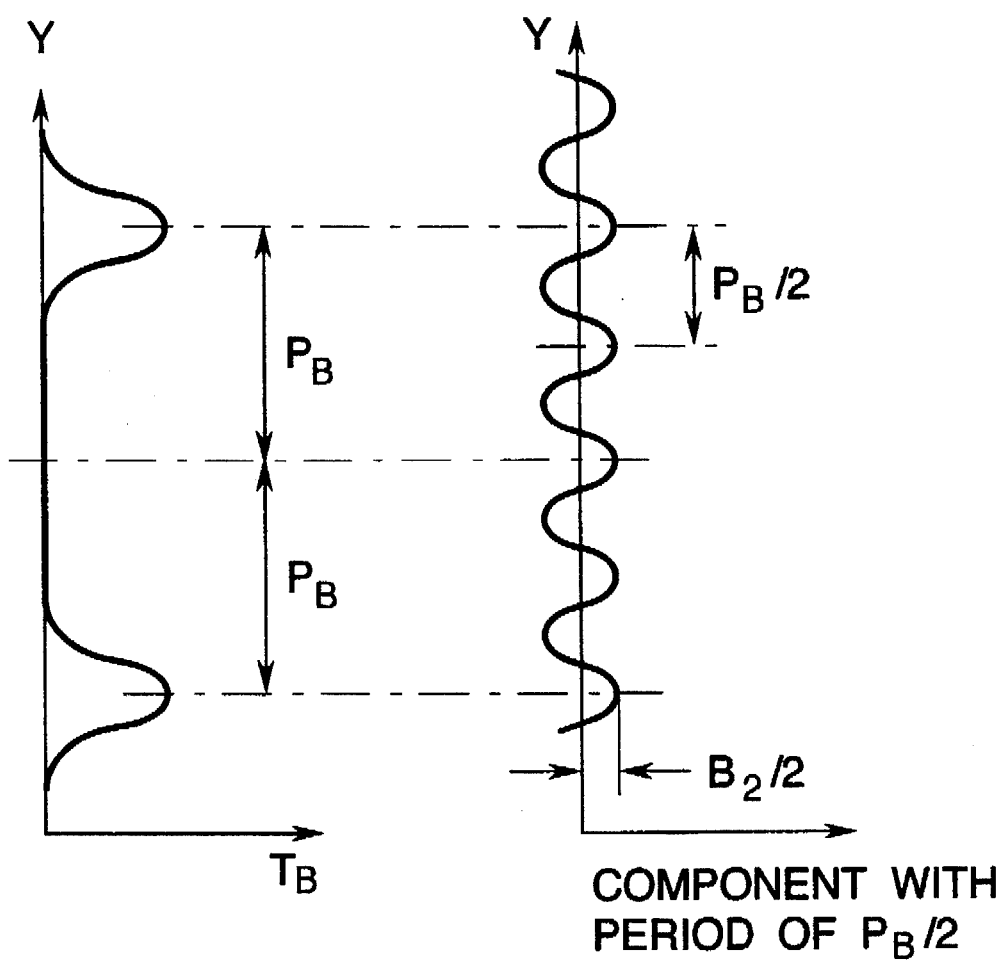

If we extract every alternate scanning line from the whole scanning lines aligned at interval $P_B$ and consider the higher harmonic component therein that has a frequency of $P_B/2$, its amplitude is $\pm B_2/2$ as shown in FIG. 10. This is because theft, the array of the scanning lines according to prior art (broken lines) shown in FIG. 8 is equivalent to two sets of the array of alternate scanning lines shown in FIG. 10, which have been overlapped with each other at an offset of $P_B$ in the Y-axis direction, and at this time the cosine wave having the amplitude $\pm B_2$ as shown in FIG. 9 is obtained by overlapping two sets of the cosine wave which are is the higher harmonic component having a period of $P_B/2$ and of the same phase.

If the two sets of the array of alternate scanning lines are displaced by an amount α ($\alpha = P_B/8$) in alternately opposite directions along the Y-axis from the position where two sets of the array are displaced by $P_B$ (i.e., the position of the prior art shown in FIG. 2) and then are overlapped with each other, the higher harmonic components each having a period of $P_B/2$ will be canceled out and then become 0. Thus, Moire pattern relating to $B_2$, that is to say, Moire pattern at mode (m, 2) will, at least in this portion of the phosphor screen 1, be extinguished. When overlapping two sets of the array, the each direction in which two sets of the array are to be displaced may be either positive direction or a negative direction parallel to the Y-axis, provided only that the direction in which the offset is imparted is opposite for each pair of neighboring scanning lines.

The above description relates to a case in which n=2, but by analogous reasoning, when n=1, α will be $P_B/4$ and when n=3, α will be $P_B/12$. Therefore, it will generally be understood that, for a given n, $\alpha = P_B/4n$.

It was explained above that in an in-line CRT, Moire pattern was particularly conspicuous in the vicinity of both edges of the phosphor screen 1, and not conspicuous at the center of the phosphor screen 1. The reason for this is as described below.

Figure 11:
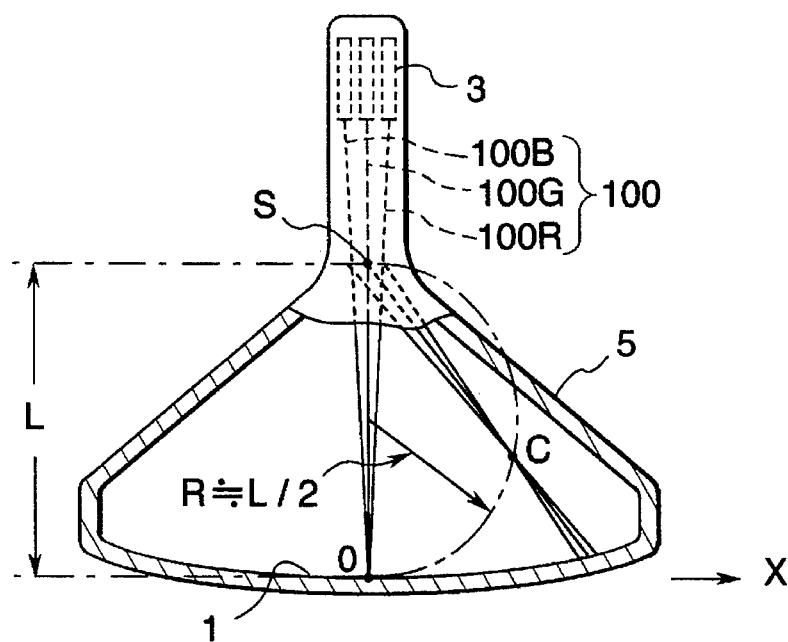
FIG. 11 is a cross-sectional diagram of an in-line color CRT cut on a horizontal plane including the central axis of the CRT.
Figure 12:
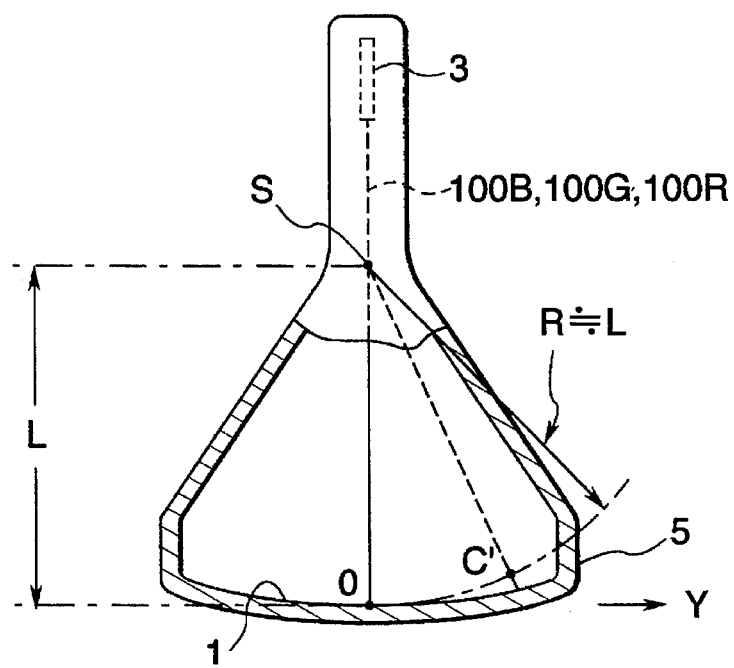
FIG. 12 is a cross-sectional diagram of the CRT of FIG. 11 cut on a vertical plane including the central axis of the CRT.

FIG. 11 shows a cross-section of an in-line CRT cut on a horizontal plane including the central axis of CRT, and FIG. 12 shows a cross-section of the same CRT cut on a vertical plane including the central axis. In the figures, a reference numeral 5 denotes the vacuum container of the CRT. In FIG. 11, the three electron beams 100B, 100G and 100R emitted by the electron gun assembly 3 are assembled so as to converge at the center point 0 of the phosphor screen 1.

If the deflection yoke is such that it generates a uniform and even magnetic field and the electron beam is deflected by the magnetic field in the X-axis direction, the electron beam will be bent in the vicinity of the point S, which is the effective center of the deflection yoke (i.e., the deflection center), and directed toward the phosphor screen 1, but will converge at point C, considerable before it reaches the phosphor screen 1. To prevent this, the deflection magnetic field that deflects the electron beam in the X-axis direction, instead of being made uniform, is given a pin-cushion distribution that has a diverging effect within the deflection plane here considered.

Similarly, in a case in which the electron beam is deflected in the Y-axis direction, as shown in FIG. 12, the electron beam will, if the distribution of the deflection magnetic field is uniform, converge at a point C' before reaching the phosphor screen 1, and then misconvergence will be produced on the phosphor screen 1. For this reason the deflection magnetic field that deflects the electron beam in the Y-axis direction, instead of being made uniform, is given n deflection barrel distribution that has a diverging effect in a direction that is at right angles to the direction of deflection.

Here, both C and C' describe loci that pass through center 0 of the phosphor screen 1, but by using an approximation calculation that omits higher order terms, C describes a circle of radius about L/2 as shown in FIG. 11, and C' similarly describes a circle of radius about L, where L is the distance from deflection center S to the center 0 of the phosphor screen 1.

This demonstrates that for the same angle of deflection, misconvergence resulting from a deflection magnetic field of uniform distribution is extremely greater in case of deflection in time X-axis direction (that is to say, the direction in which the three electron beams are aligned) than in the case of deflection in the Y-axis direction. Thus, to reduce the misconvergence, the X-deflection magnetic field is given a pin-cushion distribution and the Y-deflection magnetic field is given a barrel distribution, but the degree of the pin-cushion distribution for X-deflection must be greater, in terms of absolute values, than the degree of the barrel distribution for Y-deflection.

Figure 13A:
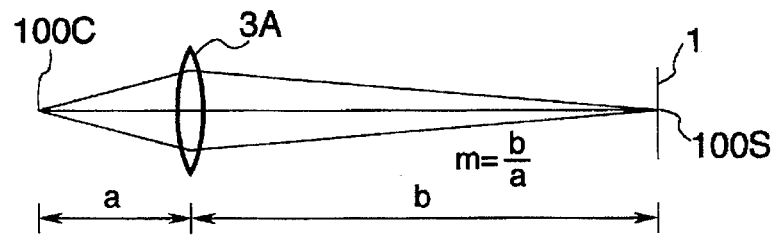
FIG. 13A is a diagram showing the formation on the phosphor screen 1 of focal spot 100S by the electron beam from the electron gun.

Giving a pin-cushion or barrel distribution to the deflection magnetic field, however, exerts other subtle influences, apart from convergence, on the focusing characteristics of each of the electron beams. FIG. 13A shows the manner in which the electron beams from the electron gun assembly for a focal spot 100S on the phosphor screen 1. The focal spot 100S on the phosphor screen 1 is the image of apparent crossover 100C which is formed in the vicinity of the electron source within the electron gun assembly 3. Thus a major factor in determining the size of the focal spot 100S is the magnification of the electro-optical system forming the image. If the distance from the apparent crossover 100C to the electron lens 3A is denoted by a, and that from electron lens 3A to the phosphor screen 1 by b, the magnification of the electro-optical system when the electron beam is not deflected will be b/a.

Figure 13B:
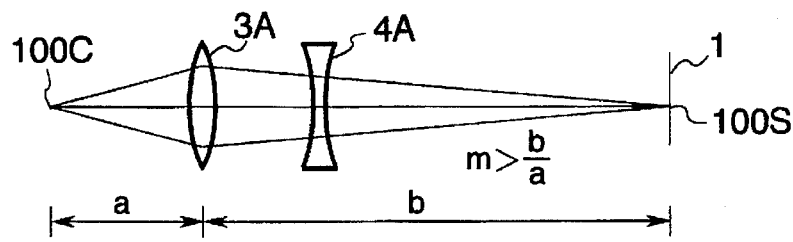
FIG. 13B and FIG. 13C are diagrams showing the lens effect of the deflection magnetic field when the electron beam from an electron gun has been deflected by the virtual lens 4A or 4B.

If this electron beam is deflected, however, the lens action due to the a deflection magnetic field will be added to the action due to the electron lens 3A in electron gun assembly 13, and, depending on the direction of deflection or on the position of the spot, there will be a drastic change in the magnification, and therefore change the beam spot diameter. Here the lens action of the deflection magnetic field is equivalent to the action of virtual lens 4A in FIG. 13B or 4B in FIG. 13C. Note that the electron beam paths in FIG. 13B and FIG. 13C are shown in abbreviated form, that the deflection of the electron beam when it passes through the virtual lens 4A or 4B is not shown, and that the distance b between the electron lens 3A and the phosphor screen 1 is shown as identical.

Figure 14:
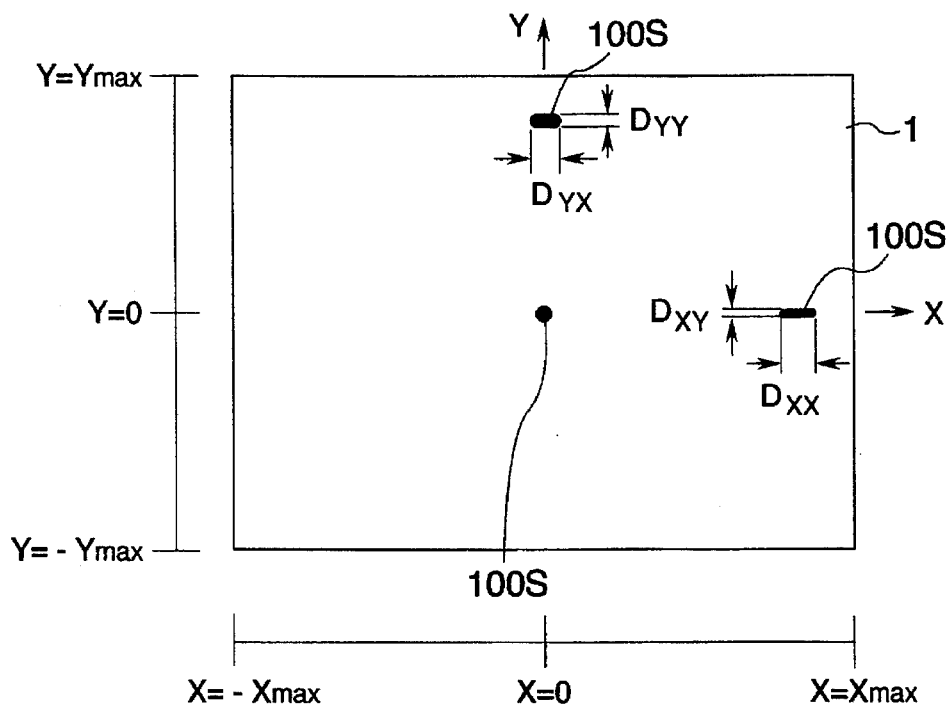
FIG. 14 is a diagram showing the shape of focal spot 100S at various positions on the phosphor screen 1.

Specifically, as shown in FIG. 14, the focal spot 100S is a circular point in the vicinity of the center of the phosphor screen 1, and then becomes, at the edges of the phosphor screen 1 in the X-axis direction, extremely elongated in the X-axis direction and extremely foreshortened in the Y-axis direction (X-direction diameter $D_{XX}$, and Y-direction diameter $D_{XY}$). The focal spot 100S becomes, at the edges of the phosphor screen 1 in the Y-axis direction, elongated in the X-axis direction and foreshortened in the Y-axis direction (X-direction diameter $D_{YX}$, and Y-direction diameter $D_{YY}$)

Figure 13C:
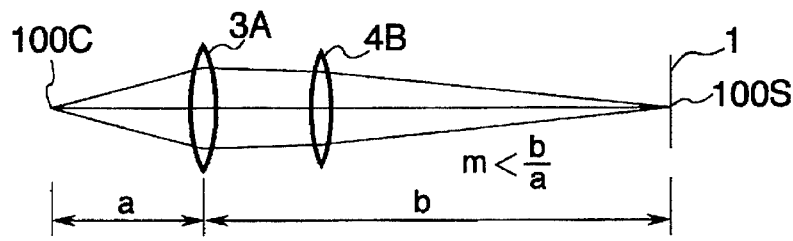

The reason that the X-direction diameter of the focal spot 100S $D_{XX}$ becomes larger when the electron beam is deflected in the X-axis direction is that, since the X-defection magnetic field has a pin-cushion distribution, the deflection magnetic field has a diverging action and acts as a concave lens, with the result that the magnification m becomes larger than b/a (FIG. 13B), while the reason that the Y-direction diameter $D_{XY}$ becomes smaller is that the deflection magnetic field has a converging action and acts as a convex lens, with the result that the magnification m becomes smaller than b/a (FIG. 13C).

Likewise, the reason that the X-direction diameter of the focal spot 100S $D_{YX}$ becomes larger when the electron beam is deflected in the Y-axis direction is that, since the Y-deflection magnetic field has a barrel distribution, the deflection magnetic field has a diverging action and acts as a concave lens, with the result that the magnification m becomes larger than b/a (FIG. 13B), while the reason that the Y-direction diameter $D_{YY}$ becomes smaller is that the deflection magnetic field has a converging action and acts as a convex lens, with the result that the magnification m becomes smaller than b/a (FIG. 13C), As has been explained above, Moire pattern occurs due to the fundamental wave component or the higher harmonic component of the periodic distribution of the electron beam excitation density caused by the array of the scanning spots. The magnitude of the fundamental wave component or the higher harmonic component generally increases, the farther the distribution of the excitation density departs from a uniform distribution. To put it another way, the amplitude of the higher harmonic component is increased, when the skirt parts (lower parts) of the curved line of the excitation density for the individual spots rise up more sharply and then do not overlap with each other. That is, Moire pattern tends to appear when |X| on the phosphor screen 1 is comparatively large. A smaller spot diameter, on the other hand, means better resolution (in that direction). That is, points at which |X| is large normally have sufficiently good resolution in the Y-axis direction.

The scanning line offset in this first embodiment produces some loss in resolution in the Y-axis direction, but it was noticed that the area which Moire pattern is strongly present coincides with the area of good resolution (in both cases, where |X| is large, that is in the vicinity of the edges of the phosphor screen 1 in the X-axis direction), so that even in Y-direction offset is imparted in the vicinity of the edges in the X-axis direction, sufficiently high resolution can be obtained.

Note that in the explanation above, the appropriate value of offset, insofar as reducing Moire pattern is concerned, was explained on the basis of FIG. 6, but this invention is not limited to that value, and is also capable of reduce Moire pattern to some extent when other values of offset are imparted. For example, when n=2, the optimum value of α is $P_B/8$, but Moire pattern is to some extent reduced even when α is smaller than this value. If we calculate using the principle, already explained, of the overlapping of two cosine waves, the amount $B_2$ of the contrast of Moire pattern when $\alpha=P_B/16$ will be approximately 0.71 times the value when there is no offset ($\alpha=0$), and if the n=4 mode is involved in Moire pattern, that portion is completely eliminated. Similarly, when $\alpha=P_B/32$, the value will be approximately 0.29 times the value with no offset.

Further, in the above explanation, the offset at the edges in the X-axis direction of the phosphor screen 1 (where $|X|=X_{max}$) is smaller than at locations somewhat toward the center, but even at the edges, the reducing effect off Moire pattern can be enough obtained.

In actual practice, with respect to the electron beam spot diameter $D_{XY}$, when $|X|$ exceeds a certain value and approaches $X_{max}$, it is usually desirable that the value of $\alpha$ decrease somewhat. The reasons for this are that, when $|X|$ exceeds a certain value and approaches $X_{max}$, the influence of high-order deflection aberration appears and that the focusing voltage applied to the electrode of the electron gun assembly 3 is adjusted so as to obtain a best resolution at a slightly inner position from the edge position where $|X|=X_{max}$, so that, diameter $D_{XY}$ in the Y-axis direction tends to increase, resolution in the Y-axis direction tends to decrease, and Moire pattern tends not to appear so readily.

Further in this first embodiment, the current ripple including a first current and a second current, both of which are sine waves, is produced by the waveform generator 50 and mixed into the Y-deflection current. By this method, not only can a substantially optimum offset distribution be achieved on the phosphor screen 1, but, for pairs of neighboring scanning lines, the offsets can be achieved in opposite directions by the application of continuous sine waves, thereby realizing simplified circuitry.

Specifically, by dividing or multiplying a signal synchronous with the X-deflection current to generate a square wave, phase-shifting the square wave, and passing it through a filter circuit, the first and second currents can be simply obtained.

Second Embodiment

In FIG. 14, spot diameter $D_{YY}$ is smaller than spot diameter $D_{YX}$, but because of the weakness of the barrel distribution of the Y-deflection field, the spot diameter $D_{YY}$ is only slightly smaller. Furthermore, even if the spot is deflected in the X-direction, moving in the vicinity of point S on the phosphor screen 1, numerous deflection aberrations will be added and the spot diameter in the Y-direction will become larger than in the vicinity of $|Y|=0$ (so that resolution will deteriorate), so Moire pattern will not readily occur. In this case, to minimize the deterioration in picture quality in the vicinity of point S resulting from the offset, it is desirable that, at points on the phosphor screen 1 at which $|Y|$ is large (i.e., in the vicinity of $Y_{max}$), the off-set of the scanning lines should be either minimized or prevented altogether.

The use of a core exhibiting current saturation characteristics for the core 52 will have the result that the core 52 will saturate at points at which Y-deflection current is large. As a result, the current waveform from the waveform generating circuit 50 will not be mixed with the Y-deflection current, and the offset will be reduced at points at which $|Y|$ is large.

In all respects other than those set forth above, this second embodiment is identical with the first embodiment.

Third Embodiment

The above embodiments describe a situation in which the first and second currents are of identical amplitude, but this invention is not limited in this respect, so that the amplitude of the first current may be made somewhat larger than that of the second current. In this case an offset will also occur in the vicinity of the center of the phosphor screen 1 (near where $|X|=0$), so that Moire pattern in the vicinity of the center can be reduced.

Fourth Embodiment

The above embodiments describe a situation in which the maximum value of the offset is established at the optimum value for reducing Moire pattern, but this invention is not limited in this respect. In case of emphasizing picture quality as evaluated by criteria other than Moire pattern, the maximum offset slay be established lower than the optimum value referred to above. On the other hand, in case of emphasizing reduction of Moire pattern, the maximum offset may be established higher than the optimum value referred to above.

Fifth Embodiment

The above embodiments describe a situation in which the first current and the second current are continuous, are generated on the basis of a continuous X-deflection current, and are overlapped onto the Y-deflection current, irrespective of the scanning frame. But this invention is not limited in this respect, so that it is also possible to detect both the synchronous signal of the X-deflection current and the synchronous signal of the Y-deflection current simultaneously, effecting control in such a way that both the magnitude and direction of the scanning offset is constant tilt the beginning of the scan in any frame. This type of control is desirable when number of scanning lines in the X-axis direction, including the X-direction scan from the end point of the scan off any frame up to the beginning point of the scan of the next frame, is an odd number. This type of control has an effect that when a continuous first current and second current are overlapped onto the Y-direction deflection current irrespective of the frame scanned, an offset is generated in the same direction for every frame, and the appearance on the phosphor screen 1 of visually flicker can be prevented. However even when the offset is of opposite direction between one frame and the next, flicker does not occur if the magnitude is not great and the Y-direction resolution is sufficiently high, and in such cases picture quality can be more effectively improved by reversing the offset direction for every frame.

Sixth Embodiment

The above embodiments describe the case of sequential scanning, but this invention is not limited in this respect, and is also applicable to interlaced scanning.

Seventh Embodiment

Figure 15:
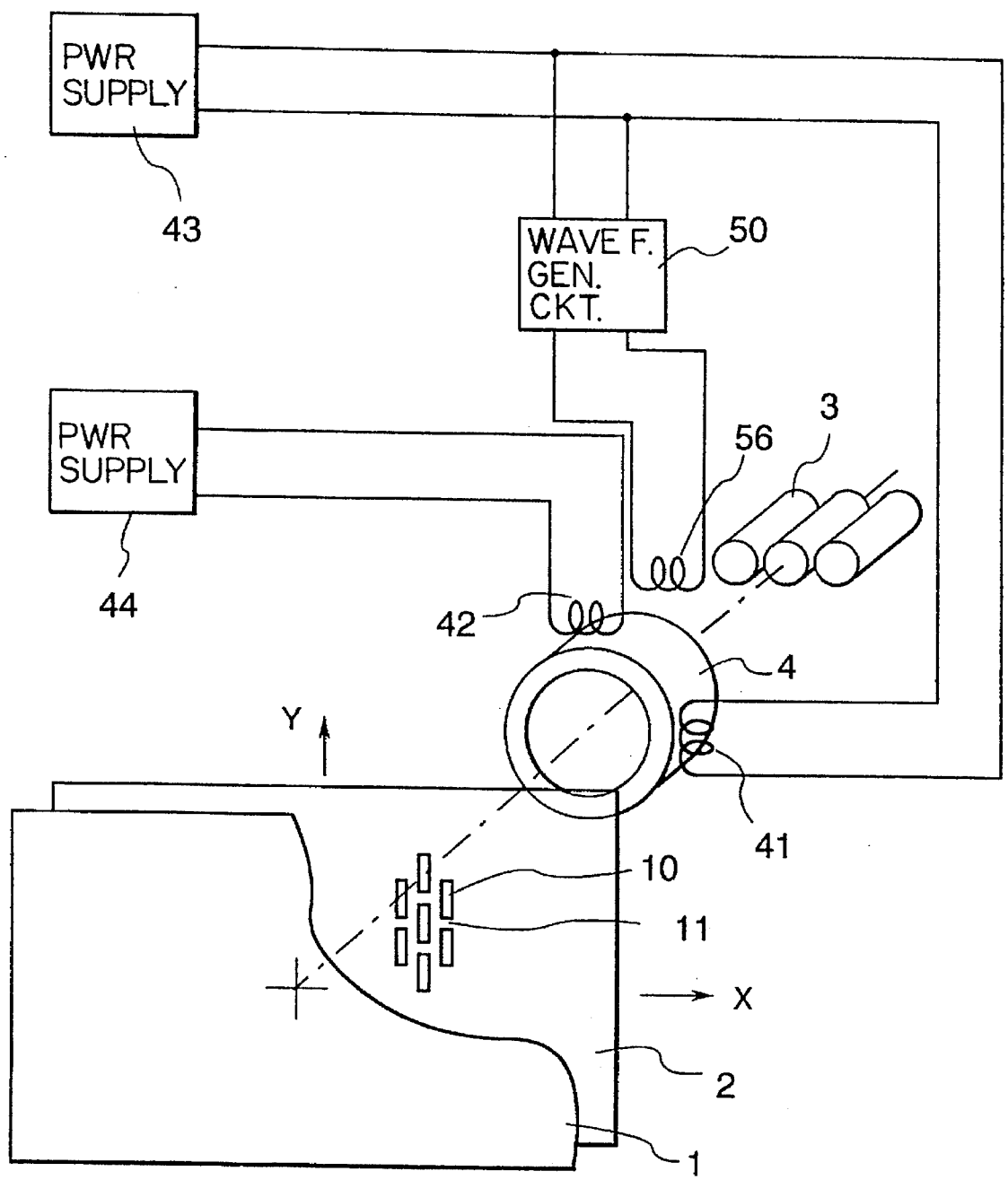
FIG. 15 is a structural diagram showing a device wherein a magnetic field generator for imparting an offset to the scanning lines is separately provided.

The above embodiments describe a situation in which scanning lines are offset by varying the value of the Y-deflection current flowing in Y-deflection coil 42, but this invention is not limited in this respect, so that, as shown in FIG. 15, it is also possible to provide, separately from Y-deflection coil 42, a magnetic field generator 56 to offset the scanning lines. The current flowing in magnetic field generator 56 will be of the same waveform as the first current and second current referred to above.

Eighth Embodiment

Figure 16:
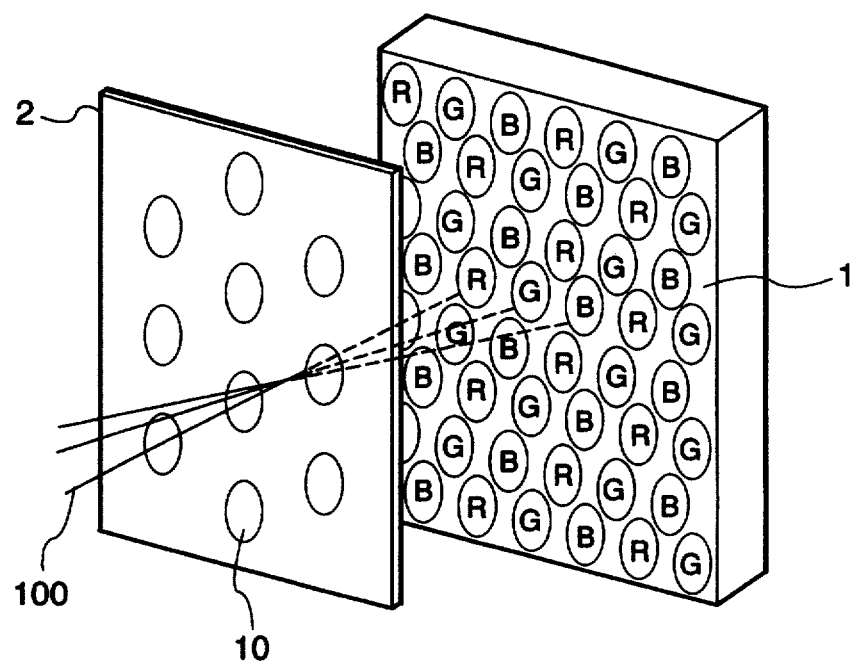
FIG. 16 shows another example of a shadowmask.

The above embodiments describe a situation in which the perforations of the shadowmask are rectangular, but this invention is not limited in this respect, and, as shown in FIG. 16, is also applicable to cases in which shadowmask 2 has circular perforations 10.

The above embodiments also describe a situation in which offset is imparted to all the scanning lines, but this invention is not limited in this respect, and offset may also be imparted only to every other scanning line. In this case it is desirable that the magnitude of the offset be double that of the first embodiment, wherein offset is imparted to all scanning lines.

What is claimed is:

1. A display device comprising:
   a substantially rectangular phosphor screen having first sides extending in an X-axis direction and second sides extending in a Y-axis direction which is at right angles to the X-axis direction;
   a shadowmask disposed oppositely to said phosphor screen and provided with a plurality of perforations arranged regularly in the X and Y-axis directions;
   an electron gun assembly for emitting an electron beam that passes through said perforations of said shadowmask and impinge on said phosphor screen;
   an X-deflection means for causing said electron beam from said electron gun assembly to scan in the X-axis direction and describe scanning lines on said phosphor screen;
   a Y-deflection means for changing a position of the scanning lines in the Y-axis direction;
   an X-deflection power supply for supplying an X-deflection current to said X-deflection means;
   a Y-deflection power supply for supplying a Y-deflection current to said Y-deflection means; and
   an offset scanning means for changing the position of the scanning lines in the Y-axis direction in such a way that directions of offset for neighboring scanning lines are opposite, while directions of the offset for alternate scanning lines are the same.

2. The display device of claim 1, wherein said offset scanning means changes the position of the scanning lines in the Y-axis direction in such a way that directions of the offset for the neighboring scanning lines are opposite and magnitude of the offset for the neighboring scanning lines is the same, while directions of the offset for alternate scanning lines are the same and magnitude of the offset for the alternate scanning lines is the same.

3. The display device of claim 1, wherein magnitude of the offset imparted to the scanning lines by said offset scanning means is large at an area on said phosphor screen in which resolution in the Y-axis direction is relatively high with respect to other areas of said phosphor screen, and small at an area on said phosphor screen in which resolution in the Y-axis direction is relatively low with respect to other areas of said phosphor screen.

4. The display device of claim 1, wherein said offset scanning means imparts the offset to the scanning lines by superimposing a current ripple onto the Y-deflection current.

5. The display device of claim 1, wherein said offset scanning means includes a magnetic field generator for imparting time offset to the scanning lines, said magnetic field generator being disposed between said Y-deflection means and said electron gun assembly.

6. The display device of claim 1,
   wherein said electron gun assembly emits a plurality of electron beams aligned in the X-axis direction; and
   wherein the X-deflection magnetic field generated by said X-deflection means has a pin-cushion distribution.

7. The display device off claim 1,
   wherein said electron gun assembly emits a plurality of electron beams aligned in the X-axis direction; and
   wherein the magnitude of the offset imparted by said offset scanning means is at the minimum when X=0 and becomes larger the closer $|X|$ comes to $X_{max}$, where X denotes a position on said phosphor screen in the X-axis direction, a center position in the X-axis direction is denoted by X=0, and respective edge positions are denoted by $X=X_{max}$ and $X=-X_{max}$.

8. The display device of claim 1,
   wherein said electron gun assembly emits a plurality of electron beams aligned in the X-axis direction; and
   wherein the magnitude of the offset imparted by said offset scanning means is at the minimum when X=0 and reaches the maximum when $|X|=0.75X_{max}$, where X denotes a position on said phosphor screen in the X-axis direction, a center position in the X-axis direction is denoted by X=0, and respective edge positions are denoted by $X=X_{max}$ and $X=-X_{max}$.

9. The display device of claim 1,
   wherein said electron gun assembly emits a plurality of electron beams aligned in the X-axis direction; and
   wherein the magnitude of the offset imparted by said offset scanning means for a specified X position becomes smaller at positions when $|Y|$ approaches $Y_{max}$ and greater at positions when $|Y|$ approaches 0, where Y denotes a position on said phosphor screen in the Y-axis direction, a center position in the Y-axis direction is denoted by Y=0, and respective edge positions are denoted by $Y=Y_{max}$ and $Y=-Y_{max}$.

10. The display device of claim 1, wherein said offset scanning means comprises:
    a waveform generating circuit for generating a current ripple; and
    a coupling circuit for superimposing the current ripple onto the Y-deflection current.

11. The display device of claim 10,
    wherein said waveform generating circuit generates a first current having a sinusoidal waveform with a frequency of $0.5f_X$ and a second current having a sinusoidal waveform with a frequency of $1.5f_X$, where $f_X$ denotes the repetition frequency of the X-deflection current;
    wherein a peak in said first current appears at X=0 and three peaks in said second current appear at $X=0.75X_{max}$, X=0 and $X=0.75X_{max}$, where X denotes a position on said phosphor screen in the X-axis direction, a center position in the X-axis direction is denoted by X=0, and respective edge positions are denoted by $X=X_{max}$ and $X=-X_{max}$; and
    wherein the peak in the first current appearing at X=0 and the peak in the second current appearing at X=0 are of opposite directions but of the same magnitude.

12. The display device of claim 1, wherein said coupling circuit comprises:
    a primary coil connected to said waveform generating circuit;
    a secondary coil connected to a circuit connecting said Y-deflection means with said Y-deflection power supply; and
    a core on which said primary coil and said secondary coil are wound;
    wherein said core is of a structure having saturating characteristics such that, when the Y-deflection current is large, the current ripple superimposed onto the Y-deflection current is reduced due to the magnetic saturating characteristics of said core.

13. The display device of claim 4, wherein the offset generating means generated a ripple current based on a frequency of the X-deflection current, and superimposes the ripple current on the Y-deflection current.

14. A method for scanning a display device which includes a substantially rectangular phosphor screen having first sides extending in an X-axis direction and second sides extending in a Y-axis direction which is at right angles to the X-axis direction, and a shadowmask disposed oppositely to said phosphor screen and provided with a plurality of perforations arranged regularly in the X and Y-axis directions, the method comprising:

emitting an electron beam that passes through said perforations of said shadowmask and impinge on said phosphor screen;

causing said electron beam to scan in the X-axis direction and describe scanning lines on said phosphor screen;

changing a position of the scanning lines in the Y-axis direction in such a way that directions of offset for neighboring scanning lines are opposite, while directions of the offset for alternate scanning lines are the same.

15. The method of claim 14, wherein the changing step changes the position of the scanning lines in the Y-axis direction in such a way that a magnitude of the offset for the neighboring scanning lines is the same, and a magnitude of the offset for the alternate scanning lines is the same.

16. The method of claim 14, wherein the changing step changes the position of the scanning lines such that a magnitude of the offset imparted to the scanning lines is large at an area on said phosphor screen in which resolution in the Y-axis direction is relatively high with respect to other areas of said phosphor screen, and small at an area on said phosphor screen in which resolution in the Y-axis direction is relatively low with respect to other areas of said phosphor screen.

17. The method of claim 14, wherein the changing step changes the position of the scanning lines based on a Y-deflection current and imparts the offset to the scanning lines by superimposing a current ripple onto the Y-deflection current.

18. The method of claim 14, wherein the emitting step emits a plurality of electron beams aligned in the X-axis direction; and the causing step generates an X-deflection magnetic field having a pin-cushion distribution.

19. The method of claim 14, wherein the emitting step emits a plurality of electron beams aligned in the X-axis direction; and the changing step changes the position of the scanning lines such that a magnitude of the offset imparted is at the minimum when X=0 and becomes larger the closer |X| comes to $X_{max}$, where X denotes a position on said phosphor screen in the X-axis direction, a center position in the X-axis direction is denoted by X=0, and respective edge positions are denoted by $X=X_{max}$ and $X=-X_{max}$.

20. The method of claim 14, wherein the emitting step emits a plurality of electron beams aligned in the X-axis direction; and the changing step changes the position of the scanning lines such that a magnitude of the offset imparted is at the minimum when X=0 and reaches the maximum when $|X|=0.75X_{max}$, where X denotes a position on said phosphor screen in the X-axis direction, a center position in the X-axis direction is denoted by X=0, and respective edge positions are denoted by $X=X_{max}$ and $X=-X_{max}$.

21. The method of claim 14, wherein the emitting step emits a plurality of electron beams aligned in the X-axis direction; and the changing step changes the position of the scanning lines such that a magnitude of the offset imparted by said offset scanning means for a specified X position becomes smaller at positions when |Y| approaches $Y_{max}$ and greater at positions when |Y| approaches 0, where Y denotes a position on said phosphor screen in the Y-axis direction, a center position in the Y-axis direction is denoted by Y=0, and respective edge positions are denoted by $Y=Y_{max}$ and $Y=-Y_{max}$.

22. The method of claim 14, wherein said changing step changes the position of the scanning lines based on a Y-deflection current and includes the steps of, generating a current ripple; and superimposing the current ripple onto the Y-deflection current.

23. The method of claim 22, wherein the causing step cause the electron beam to scan in the X-axis direction based on an X-deflection current;

the generating step generates a first current having a sinusoidal waveform with a frequency of $0.5f_x$ and a second current having a sinusoidal waveform with a frequency of $1.5f_x$, where $f_x$ denotes the repetition frequency of the X-deflection current;

wherein a peak in said first current appears at X=0 and three peaks in said second current appear at $X=-0.75X_{max}$, X=0 and $X=0.75X_{max}$, where X denotes a position on said phosphor screen in the X-axis direction, a center position in the X-axis direction is denoted by X=0, and respective edge positions are denoted by $X=X_{max}$ and $X=-X_{max}$; and wherein the peak in the first current appearing at X=0 and the peak in the second current appearing at X=0 are of opposite directions but of the same magnitude.

* * * * *

UNITED STATES PATENT AND TRADEMARK OFFICE
CERTIFICATE OF CORRECTION

PATENT NO. : 5,635,803
DATED : June 3, 1997
INVENTOR(S) : Takeo FUJIMURA

It is certified that error appears in the above-indentified patent and that said Letters Patent is hereby corrected as shown below:

```
In the Drawings, add Fig. 16, as shown on the attached page.
Column 4, line 53, "Fig. 8A" should be changed to --Fig. 3A--.
Column 5, line 61, "wily" should be changed to --why--.
Column 6, line 24, "theft" should be changed to --that--.
Column 10, line 10, "slay" should be changed to --may--.
Column 11, line 58, "off" should be changed to --of--.
```

Signed and Sealed this

Twenty-third Day of December, 1997

Attest:

BRUCE LEHMAN

*Attesting Officer*   *Commissioner of Patents and Trademarks*